United States Patent [19]
Vavalidis

[11] Patent Number: 5,772,240
[45] Date of Patent: Jun. 30, 1998

[54] AIR-BAG ARRANGEMENT

[75] Inventor: Kyriakos Vavalidis, Ferrieres-En-Bray, France

[73] Assignee: Autoliv Development AB, Vargarda, Sweden

[21] Appl. No.: 700,480

[22] PCT Filed: Feb. 22, 1995

[86] PCT No.: PCT/SE95/00184

§ 371 Date: Oct. 23, 1996

§ 102(e) Date: Oct. 23, 1996

[87] PCT Pub. No.: WO95/24328

PCT Pub. Date: Sep. 14, 1995

[30] Foreign Application Priority Data

Mar. 10, 1994 [GB] United Kingdom .................. 9404748

[51] Int. Cl.$^6$ ................................................. B60R 21/16
[52] U.S. Cl. ....................................... 280/728.3; 280/732
[58] Field of Search ............................... 280/728.3, 731, 280/732

[56] References Cited

U.S. PATENT DOCUMENTS

| | | | |
|---|---|---|---|
| 4,903,986 | 2/1990 | Cok et al. | 280/731 |
| 4,989,895 | 2/1991 | Pearson et al. | 280/731 |
| 5,082,310 | 1/1992 | Bauer | 280/728.3 |
| 5,110,647 | 5/1992 | Sawada et al. | 280/728.3 |
| 5,143,401 | 9/1992 | Zushi | 280/728.3 |
| 5,172,931 | 12/1992 | Baba et al. | 280/728.3 |

FOREIGN PATENT DOCUMENTS

| | | |
|---|---|---|
| 90 01 948 | 7/1990 | Germany . |
| 0428935 | 5/1991 | Germany . |
| 4115913 | 11/1991 | Germany . |
| 4241728 | 6/1993 | Germany . |
| 2244243 | 11/1991 | United Kingdom . |
| 2249062 | 4/1992 | United Kingdom . |
| 2 267 064 | 11/1993 | United Kingdom . |

*Primary Examiner*—Paul N. Dickson
*Attorney, Agent, or Firm*—Spencer & Frank

[57] ABSTRACT

A cover for an air-bag includes a laminate having an inner layer of polymer material and an outer layer of polymer material. Each layer defines a line of mechanical weakness, the line of mechanical weakness in the outer layer being laterally displaced by at least 2 millimeters relative to the line of mechanical weakness in the inner layer such that the inner layer do not overlie one another, the lines of mechanical weakness in the outer layer and in the inner layer together defining a door in the cover adapted to open when a predetermined pressure is provided from the air-bag, the lines of mechanical weakness in the outer layer and in the inner layer further being constituted by lines of reduced thickness.

15 Claims, 1 Drawing Sheet

AIR-BAG ARRANGEMENT

FIELD OF THE INVENTION

The present invention relates to an air-bag arrangement.

BACKGROUND OF THE INVENTION

It has been proposed to provide an air-bag in a motor vehicle, means being provided to inflate the air-bag in the event that an accident should arise, the inflated air-bag providing protection for the driver of the vehicle or a passenger in the vehicle.

The air-bag is, prior to use, usually concealed behind a cover. The cover may form the central part of a steering wheel, if the air-bag is intended to provide protection for the driver of the vehicle, or the cover may form part of the dash-board of the vehicle, if the air-bag is to provide protection for a passenger within the vehicle.

Typically, an air-bag cover is made of a laminate of two layers of plastics material. The inner layer is relatively stiff and hard and provides the cover with the desired degree of strength, and the outer layer is softer, sometimes being made of a foam with an outer "skin".

The inner layer is such that the entire cover forms an integral part of the central part of the steering wheel or forms an integral part of a dashboard. The outer layer is to provide the usual degree of comfort that is found in a motor vehicle.

It is necessary to provide the cover with a line of mechanical weakness, so that, when the air-bag is inflated one or more parts of the cover form "doors" which hinge outwardly when subjected to a predetermined pressure to permit the air-bag to be inflated in the desired manner. This is usually achieved by providing a line of mechanical weakness or a "splitline".

FIG. 1 in the accompanying drawings comprises a sectional view through part of a typical present-day air-bag cover. The inner layer 1 comprises a relatively hard plastic material such as a thermoplastic elastomer and has a region 2 where the thickness of the layer is substantially less than in the remaining parts of the layer. The region 2 thus comprises a line of mechanical weakness. The region 2 is also deformed upwardly.

The layer 1 of thermoplastic elastomer supports an upper outer relatively thick layer 3 which may also be formed of thermoplastic elastomer, although the elastomer may be relatively soft, and it can be seen that, because of the deformed configuration of the inner layer 1, in the region 4 the layer of polyurethane foam 3 also has a reduced thickness. The region 2 is aligned with or overlies the region 4 and this combined region thus comprises a "splitline". A portion of the cover to one side of the splitline (or portions on both sides of the splitline) may open in the manner of a "door" when subjected to a predetermined pressure as the air-bag is inflated.

It has been found that when a cover of this particular type is manufactured, even though the outer surface of the outer layer is substantially smooth, nevertheless the precise location of the "splitline" constituted by the regions 2 and 4 of reduced thickness, is clearly visible. This can be unsightly.

It has been proposed to avoid the unsightliness by providing, as shown in FIG. 2, a depressed "style line" 5 in the outer surface of the outer layer 3 of the cover. However, this does mean that the pattern of the "style" lines 5 has to coincide with the pattern defined by the lines of mechanical weakness, and such a pattern may not be aesthetically pleasing and, especially where the air-bag cover forms part of the dashboard, may look very much "out of place".

SUMMARY OF THE INVENTION

The present invention seeks to provide an improved air-bag arrangement.

According to this invention there is provided a cover for an air-bag, the cover comprising a laminate consisting an inner layer of polymer material and an outer layer of polymer material, each layer being provided with a line of mechanical weakness, the line of mechanical weakness in the outer layer being displaced at least 2 millimeters relative to the line of mechanical weakness in the inner layer, these splitlines together defining a door in the cover adapted to open when a predetermined pressure is provided from the inside, the lines of mechanical weakness in each layer being constituted lines of reduced thickness.

Preferably the inner layer is made of a relatively hard and strong material, and the outer layer is made of a softer material.

Conveniently both layers are made of thermoplastic elastomer.

In one embodiment the thickness of each layer is between 1.5 and 3 millimeters.

Preferably in the region of the line of mechanical weakness formed in the outer layer, the inner layer is provided with a protrusion or ridge rising up into the outer layer, so that the outer surface of the outer layer can be substantially flush even though the material of the outer layer in the region above the ridge is thinner than the material of the outer layer in other regions of the outer layer.

In one embodiment the thickness of the outer layer in the region of the line of mechanical weakness is between 0.5 and 1 millimeter.

Conveniently the line of mechanical weakness in the inner layer comprises an elongate channel constituting a line of reduced thickness, there being a plurality of apertures formed through the base of the channel, those apertures extending completely through the inner layer.

Preferably the apertures are of elongate form.

In one embodiment the apertures have a width of between 0.5 and 1 millimeter and have a length of between 3 and 10 millimeters, and preferably the apertures each have a length of approximately 5 millimeters.

Preferably the apertures are evenly spaced, the distance between the apertures being substantially equal to the length of each aperture.

In one embodiment the thickness of the part of the inner cover comprising the line of reduced thickness is between 0.5 and 1 millimeter.

Preferably the splitline in the inner layer is off-set from the splitline in the outer layer by between 2 and 10 millimeters.

Conveniently the splitline in the inner layer is off-set from this splitline in the outer layer by between 4 and 6 millimeters.

Most preferably the splitline and the inner layer is off-set from the splitline in the outer layer by approximately 5 millimeters.

The invention also relates to an air-bag arrangement incorporating an air-bag as described above.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
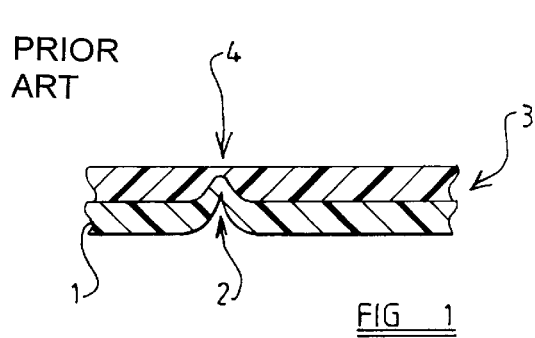
FIG. 1 is a sectional view through a part of a prior art air cover.
Figure 2:
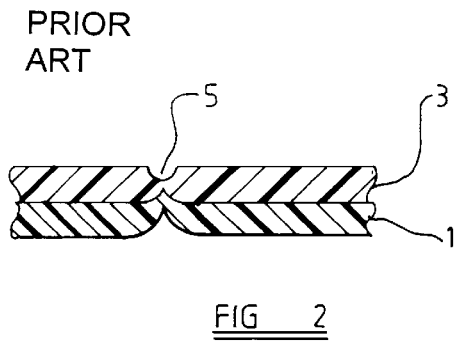
FIG. 2 is a sectional view through a part of another embodiment of a prior art air cover.
Figure 3:
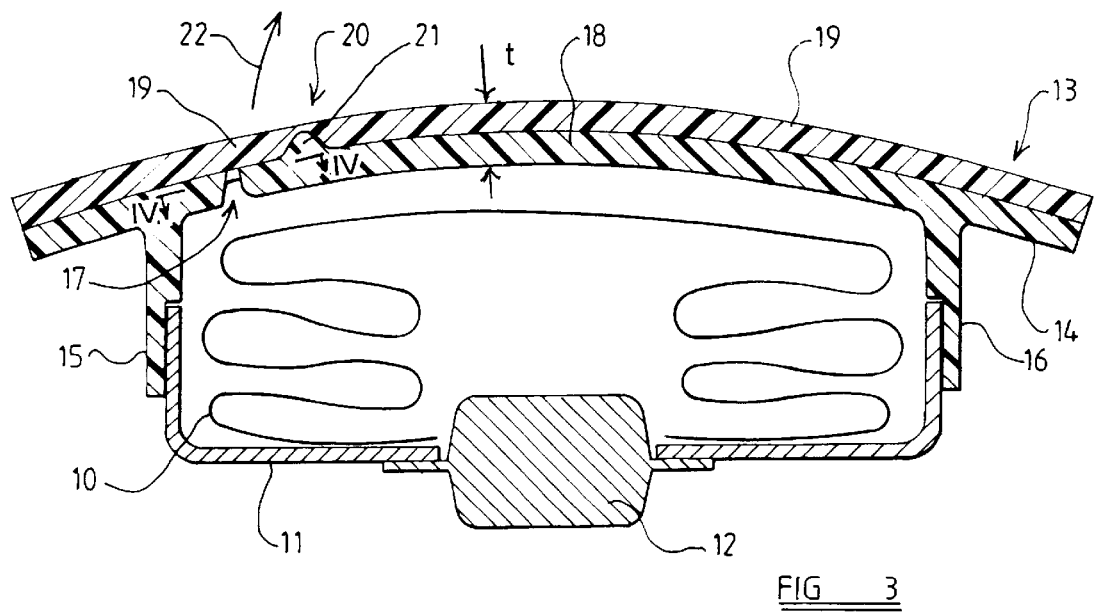
FIG. 3 is a sectional view of an air-bag arrangement incorporating a cover in accordance with the invention.

Referring initially to FIG. 3 and air-bag 10 is mounted within a housing 11 which supports a gas generator 12. A cover 13 is provided which is mounted on the housing 11.

The cover 13 comprises an inner layer 14 made of a thermoplastic elastomer. The layer 14 has two downwardly projecting flanges 15,16 which are connected to the housing 11, as is conventional.

A line of mechanical weakness 17 is provided in the layer 14, thus defining a portion 18 of the layer 14 that can open in the manner of a door as will be described hereinafter. As can be seen from FIG. 3 the line of mechanical weakness 17 comprises an elongate channel, the material of the layer 14 between the base of the channel and the top of the layer 14, is of reduced thickness.

Figure 4:
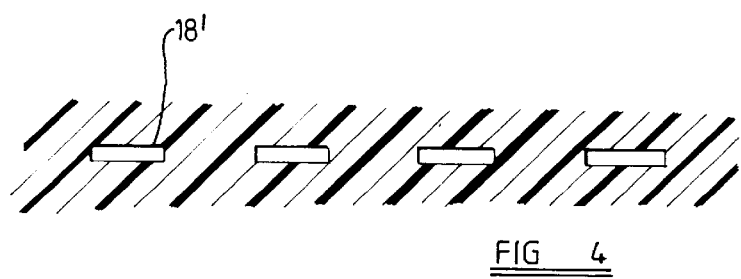
FIG. 4 is a sectional view taken on the line IV—IV of FIG. 3.

As can be seen, however, from FIG. 4, a plurality of elongate apertures 18' are formed in the base of the channel 17, the apertures 18' thus totally penetrating the layer 14 and exposing the under-surface of an outer layer 19, which is laminated to the layer 14. The outer layer 19 may be formed of thermoplastic elastomer, the elastomer chosen for the outer layer 19 being softer than the thermoplastic elastomer chosen for the inner layer 14. However, other materials, such as polyurethane foam, may be used for the outer layer 19.

At a position which is displaced from the position of the line of mechanical weakness 17 formed in the layer 14, a second line of mechanical weakness 20 is defined in the outer layer 19.

In the region of the line of mechanical weakness 20, the outer surface of the cover is substantially smooth, and there is a protrusion 21 formed on the outer surface of the inner layer 14.

Whilst the thickness of the inner layer 14 and the thickness of the outer layer 19 may be selected to be between 1.5 and 3 millimeters, in the illustrated embodiment, the thickness of the inner layer 14 is 2 millimeters and the thickness of the outer layer 19 is 2.5 millimeters.

Whilst the thickness of the material in the outer layer 19 forming the line of mechanical weakness may be between 0.5 and 3 millimeters, in the described embodiment the thickness of the material at this point, at the top of the protrusion 21, is approximately 0.8 millimeters.

The channel forming the line of mechanical weakness 17 may have a width of approximately 1 millimeter and may have such a depth that the thickness of the material forming the first layer between the base of the channel and the top part of the layer 14 may be between 0.5 and 1 millimeters. In the illustrated embodiment the thickness of the material between the base of the channel forming the line of mechanical weakness 17 and the top surface of the layer 14 is substantially 1 millimeter.

Preferably the slots 18 and the regions between adjacent slots 18 have the same length. This length may be between 3 and 10 millimeters, but, in the described embodiment, is 5 millimeters. The slot apertures may have a width of between 0.5 and 1 millimeter, but in the described embodiment have a width of 1 millimeter which is equal to the width of the channel forming the line of mechanical weakness 17.

The line of mechanical weakness 17 may be laterally off-set or displaced from the line of mechanical weakness 20 by a distance of between 2 and 10 millimeters, the preferred distance being between 4 and 6 millimeters. As seen clearly in FIG. 3, the lateral offset is defined in a direction perpendicular to a thickness t of the cover. In the illustrated embodiment the distance of the off-set is 5 millimeters.

When the air-bag 10 is inflated, when a predetermined pressure is applied to the underside of the layer 14, the inner layer 14 will split along the line of mechanical weakness 17, the portion 18 which opens as a door, thus opening in the direction of the arrow 22. As the door opens, the upper layer 19 splits along the splitline 20.

Although the off-set splitlines enable the "door" 18 to open in a satisfactory manner, it has been found that by using a design as described above, the location of the splitline cannot be seen from the exterior of the cover.

I claim:

1. A cover for an air-bag comprising a laminate including an inner layer of polymer material and an outer layer of polymer material, each layer defining a line of mechanical weakness, the line of mechanical weakness in the outer layer being laterally displaced by at least 2 millimeters relative to the line of mechanical weakness in the inner layer such that the lines of mechanical weakness in the outer layer and in the inner layer do not overlie one another, the lines of mechanical weakness in the outer layer and in the inner layer together defining a door in the cover adapted to open when a predetermined pressure is provided from the air-bag, the lines of mechanical weakness in the outer layer and in the inner layer further being constituted by lines of reduced thickness.

2. The cover according to claim 1, wherein the inner layer is made of a relatively hard and strong material, and the outer layer is made of a softer material.

3. The cover according to claim 1, wherein both layers are made of thermoplastic elastomer.

4. The cover according to claim 1, wherein each layer has a thickness between 1.5 and 3 millimeters.

5. The cover according to claim 1, wherein, in a region of the line of mechanical weakness in the outer layer, the inner layer defines a protrusion rising up into the outer layer, so that an outer surface of the outer layer is substantially flush even though the outer layer, in a region above the protrusion, is thinner than the outer layer in other regions thereof.

6. The cover according to claim 1, wherein the outer layer has a thickness between 0.5 and 1 millimeter in the region of its line of mechanical weakness.

7. The cover according to claim 1, wherein the line of mechanical weakness in the inner layer is defined by an elongate channel constituting a line of reduced thickness, the inner layer further defining a plurality of apertures through the base of the elongate channel which extend completely through a thickness of the inner layer.

8. The cover according to claim 7, wherein the apertures are of elongate form.

9. The cover according to claim 7, wherein the apertures have a width between 0.5 and 1 millimeter and have a length of between 3 and 10 millimeters.

10. The cover according to claim 7, wherein the apertures each have a length of approximately 5 millimeters.

11. The cover according to claim 7, wherein the apertures are evenly spaced with respect to one another, a distance between the apertures being substantially equal to a length of each aperture.

12. The cover according to claim 1, wherein the inner cover has a thickness between 0.5 and 1 millimeter in a region of its line of mechanical weakness.

13. The cover according to claim 1, wherein the line of mechanical weakness in the inner layer is laterally off-set with respect to the line in the outer layer by between 2 and 10 millimeters.

14. The cover according to claim 13, wherein the line of mechanical weakness in the inner layer is laterally off-set with respect to the line of mechanical weakness in the outer layer by between 4 and 6 millimeters.

15. The cover according to claim 14, wherein the line of mechanical weakness in the inner layer is off-set with respect to the line of mechanical weakness in the outer layer by approximately 5 millimeters.

* * * * *